United States Patent
Mandic et al.

(10) Patent No.: US 9,857,945 B2
(45) Date of Patent: *Jan. 2, 2018

(54) SEGMENT RING MENU

(71) Applicant: Microsoft Technology Licensing, LLC, Redmond, WA (US)

(72) Inventors: Mirko Mandic, Seattle, WA (US); Marina Dukhon, Kirkland, WA (US); Mark Pearson, Kirkland, WA (US); Clay Satterfield, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 378 days.

This patent is subject to a terminal disclaimer.

(21) Appl. No.: 14/511,923

(22) Filed: Oct. 10, 2014

(65) Prior Publication Data
US 2015/0033171 A1 Jan. 29, 2015

Related U.S. Application Data

(63) Continuation of application No. 11/823,997, filed on Jun. 29, 2007, now Pat. No. 8,869,065.

(51) Int. Cl.
*G06F 3/0482* (2013.01)
*G06F 3/0486* (2013.01)

(52) U.S. Cl.
CPC .......... *G06F 3/0482* (2013.01); *G06F 3/0486* (2013.01); *G06F 2203/04807* (2013.01)

(58) Field of Classification Search
CPC ......... G06F 3/0482; G06F 2203/04804; G06F 3/0486; G06F 2203/04807
See application file for complete search history.

(56) References Cited

U.S. PATENT DOCUMENTS

| 4,896,291 A | 1/1990 | Gest et al. |
| 5,283,560 A | 2/1994 | Bartlett |
| 5,588,107 A | 12/1996 | Bowden et al. |
| 5,664,133 A | 9/1997 | Malamud et al. |
| 5,721,853 A | 2/1998 | Smith |
| 5,790,820 A | 8/1998 | Vayda et al. |

(Continued)

FOREIGN PATENT DOCUMENTS

| JP | 03-085616 | 4/1991 |
| JP | 08-123647 | 5/1996 |

(Continued)

OTHER PUBLICATIONS

Moseley, et al. "Mastering Microsoft Office 97." 1997. Profesional Edition. pp. 32-52.*

(Continued)

*Primary Examiner* — Kieu Vu
*Assistant Examiner* — Blaine Basom

(57) ABSTRACT

A segment ring menu is provided that is used to easily access menu items. The segment ring menu includes a number of menus that are located equidistant from an initial mouse position from where the segment ring menu is evoked. Hovering over any of the sections of the segment ring menu displays the menu items hosted in that section. The segment ring menu layout is directed at making it easy for the user to reach any of the menu items with a small amount of mouse movement.

20 Claims, 4 Drawing Sheets

(56) References Cited

U.S. PATENT DOCUMENTS

| | | | |
|---|---|---|---|
| 5,828,360 A * | 10/1998 | Anderson | G06F 3/03545 345/902 |
| 5,828,376 A | 10/1998 | Solimene et al. | |
| 5,854,629 A | 12/1998 | Redpath | |
| 6,414,700 B1 | 7/2002 | Kurtenbach et al. | |
| 6,448,987 B1 | 9/2002 | Easty et al. | |
| 6,466,235 B1 | 10/2002 | Smith et al. | |
| 6,493,006 B1 | 12/2002 | Gourdol et al. | |
| 6,583,798 B1 | 6/2003 | Hoek et al. | |
| 6,614,455 B1 | 9/2003 | Cuijpers et al. | |
| 6,618,063 B1 | 9/2003 | Kurtenbach | |
| 6,704,031 B1 * | 3/2004 | Kimball | G06F 9/4443 714/E11.195 |
| 7,058,902 B2 | 6/2006 | Iwema et al. | |
| 7,096,431 B2 | 8/2006 | Tambata et al. | |
| 7,210,107 B2 | 4/2007 | Wecker et al. | |
| 7,246,329 B1 * | 7/2007 | Miura | G06F 3/0482 715/764 |
| 8,607,149 B2 | 12/2013 | Hintermeister | |
| 8,645,863 B2 | 2/2014 | Mandic | |
| 8,869,065 B2 | 10/2014 | Mandic et al. | |
| 2002/0101450 A1 | 8/2002 | Magendanz | |
| 2002/0140740 A1 | 10/2002 | Chen | |
| 2003/0076364 A1 | 4/2003 | Martinez et al. | |
| 2004/0135824 A1 | 7/2004 | Fitzmaurice | |
| 2004/0139401 A1 | 7/2004 | Unbedacht et al. | |
| 2006/0013610 A1 | 1/2006 | Martin et al. | |
| 2006/0036945 A1 | 2/2006 | Radtke et al. | |
| 2006/0036964 A1 | 2/2006 | Satterfield | |
| 2006/0095865 A1 | 5/2006 | Rostom | |
| 2007/0157125 A1 | 7/2007 | Peters | |
| 2007/0162898 A1 | 7/2007 | Ramani et al. | |
| 2007/0234223 A1 | 10/2007 | Leavitt | |
| 2007/0250793 A1 | 10/2007 | Miura | |
| 2008/0059913 A1 | 3/2008 | Burtner et al. | |
| 2009/0007012 A1 | 1/2009 | Mandic et al. | |
| 2014/0143699 A1 | 5/2014 | Mandic et al. | |

FOREIGN PATENT DOCUMENTS

| | | |
|---|---|---|
| JP | 08-140003 | 5/1996 |
| JP | H-08-123649 | 5/1996 |
| JP | 10-065985 | 3/1998 |
| JP | 10-307697 | 11/1998 |
| JP | Hei 11-327728 | 11/1999 |
| JP | 2001-273512 | 10/2001 |
| JP | 2001273512 | 10/2001 |
| JP | 2006059359 | 3/2006 |
| JP | 2007-094531 A | 4/2007 |
| JP | 2007-286135 | 11/2007 |
| RU | 2005125839 | 2/2007 |

OTHER PUBLICATIONS

Korean Office Action Issued in Application No. 10-2015-7036762, dated Apr. 21, 2016, 7 pages.
Korean Office Action Issued in Application No. 10-2010-7028411, dated Apr. 30, 2015, 12 pages.
Isreal Office Action Issued in Application No. 209016, dated Jul. 22, 2015, 6 pages.
Amendment filed Aug. 25, 2010, in U.S. Appl. No. 11/823,997, 10 pgs.
Amendment filed Aug. 7, 2012, in U.S. Appl. No. 11/823,997, 9 pgs.
Amendment filed Jun. 3, 2011, in U.S. Appl. No. 12/147,156, 9 pgs.
Amendment filed Jun. 4, 2013, in U.S. Appl. No. 12/147,156, 9 pgs.
Amendment filed Mar. 13, 2012, in U.S. Appl. No. 12/147,156, 8 pgs.
Amendment filed Mar. 24, 2011, in U.S. Appl. No. 11/823,997, 9 pgs.
Amendment filed Mar. 28, 2013, in U.S. Appl. No. 11/823,997, 10 pgs.
Amendment filed Nov. 30, 2011, in U.S. Appl. No. 11/823,997, 8 pgs.
Amendment filed Oct. 11, 2012, in U.S. Appl. No. 12/147,156, 9 pgs.
Amendment filed Oct. 29, 2010, in U.S. Appl. No. 12/147,156, 8 pgs.
Australian Notice of Allowance mailed in Application 2009262813, dated Apr. 9, 2014, 2 pgs.
Australian Office Action mailed in Application 2009262813, dated Feb. 18, 2014, 3 pgs.
Calvary et al.; "*Supporting Context Changes for Plastic User Interfaces: A Process and a Mechanism*"; 20 pgs.
Chilean 1st Office Action issued in CL Appl. No. 1558-2010, w/English summary dated Mar. 27, 2012, 8 pgs.
Chilean 2nd Office Action dated Sep. 4, 2012, issued in CL Appl. No. 1558-2010, w/English summary, 10 pgs.
Chinese 1st Office Action dated Jul. 4, 2012, issued in CN Appl. No. 200980124787.X, w/English Translation, 12 pgs.
Chinese 2nd Office Action dated Feb. 16, 2013, issued in CN Appl. No. 200980124787.X, w/English Translation, 11 pgs.
Chinese 3rd Office Action dated Aug. 8, 2013, issued in CN Appl. No. 200980124787.X, w/English Translation, 12 pgs.
Chinese 4th Office Action dated Dec. 4, 2013, issued in CN Appl. No. 200980124787.X, w/English Translation, 11 pgs.
Chinese Notice on Reexamination in Application 200980124787.X, dated Sep. 19, 2014, 14 pgs. pgs.
Ericson; "Final Review: The Lowdown on Office 2007"; http://www.computerworld.com/action/article.do?command=viewArticleBasic&articleId=9003994&pageNumber=2; 4 Pgs.
European Search Report dated Apr. 24, 2012, in EP Appl. No. 09770685.7, 6 pgs.
Israeli Office Action in Application 209016, dated Jan. 26, 2014, 7 pgs.
Japanese Final Decision on Rejection in Application 2011-516391, dated Mar. 7, 2014, 5 pgs.
Japanese Notice of Allowance in Application 2011-516391, dated Sep. 26, 2014, 3 pgs.
Japanese Office Action dated May 14, 2013, issued in JP Appl. No. 2011-516391, w/English translation, 5 pgs.
Koved et al., "*Embedded Menus: Selecting Items in Context*"; Apr. 1986; pp. 312-318; vol. 29, No. 4.
Kurtenbach et al.; "*Issues in Combining Marking and Direct Manipulation Techniques*"; 1991; pp. 1-13; http://www.billbuxton.com/GEdit.html.
Microsoft; "How to Create a Mouse Capture Context Menu"; http://msdn2.microsoft.com/en-us/library/ms537651(VS.85).aspx; 2008; 5 pgs.
Montclair State University; "What's New in Microsoft Office 2007"; http://oit.montclair.edu/documentationpdf/Office_2007_What_New.pdf; Apr. 17, 2007; pp. 1-6.
Moseley, et al. "Mastering Microsoft Office 97"; 1997; Professional Edition, pp. 33-52.
Office Action dated Apr. 1, 2010 in U.S. Appl. No. 11/823,997, 20 pgs.
Office Action dated Dec. 28, 2012, in U.S. Appl. No. 11/823,997, 25 pgs.
Office Action dated Dec. 4, 2012, in U.S. Appl. No. 12/147,156, 21 pgs.
Office Action dated Feb. 7, 2012, in U.S. Appl. No. 12/823,997, 18 pgs.
Office Action dated Feb. 7, 2014, in U.S. Appl. No. 11/823,997, 22 pgs.
Office Action dated Jan. 3, 2011, in U.S. Appl. No. 12/147,156, 18 pgs.
Office Action dated Jul. 10, 2013, in U.S. Appl. No. 11/823,997, 31 pgs.
Office Action dated Jun. 3, 2011, in U.S. Appl. No. 11/823,997, 22 pgs.
Office Action dated May 11, 2010, in U.S. Appl. No. 12/147,156, 17 pgs.
Office Action dated May 22, 2012, in U.S. Appl. No. 12/147,156, 18 pgs.
Office Action dated Nov. 10, 2010, in U.S. Appl. No. 11/823,997, 19 pgs.

(56) References Cited

OTHER PUBLICATIONS

Office Action dated Sep. 13, 2011, in U.S. Appl. No. 12/147,156, 16 pgs.
PCT International Search Report dated Nov. 30, 2009, in Appl. No. PCT/US2009/045940, 11 pgs.
Russian Decision on Grant in Application 2010153323, w/English Translation, 17 pgs.
Russian Office Action dated May 28, 2013, issued in RU Appl. No. 2010153323, with English summary, 5 pgs.
U.S. Appl. No. 11/823,997, Amendment after Allowance filed Jul. 23, 2014, 7 pgs.
U.S. Appl. No. 11/823,997, Amendment and Response filed Jan. 8, 2014, 10 pgs.
U.S. Appl. No. 11/823,997, Response after Amendment dated Sep. 11, 2014, 2 pgs.
U.S. Appl. No. 11/823,997, Amendment and Response filed May 2, 2014, 9 pgs.
U.S. Appl. No. 11/823,997, Notice of Allowance dated Jun. 20, 2014, 5 pgs.
U.S. Appl. No. 12/147,156, Notice of Allowance dated Oct. 3, 2013, 10 pgs.
Chinese Decision on Reexamination in Application 200980124787.X, dated Feb. 17, 2015, 21 pgs.
Malaysian Notice of Allowance in Application PI 2010005577, dated Feb. 27, 2015, 2 pgs.
Canadian Notice of Allowance in Application 2725021, dated May 3, 2016, 1 page.
U.S. Appl. No. 14/164,123, Office Action dated Apr. 5, 2016, 34 pgs.
Canadian Office Action in Application 2725021, dated Oct. 16, 2015, 4 pgs.
Korean Non-Final Rejection in Application 10-2010-7028411, dated Nov. 24, 2015, 6 pgs.
U.S. Appl. No. 14/164,123, Amendment and Response filed Dec. 2, 2016, 7 pages.
U.S. Appl. No. 14/164,123, Notice of Allowance dated Oct. 21, 2016, 5 pages.
European Office Action in Application 09770685.7, dated Nov. 15, 2016, 6 pgs.
Israel Office Action in Application 248061, dated Sep. 29, 2016, 5 pgs. (with Eng. Translation).

\* cited by examiner

SEGMENT RING MENU

CROSS-REFERENCE TO RELATED APPLICATIONS

This application is a continuation of U.S. application Ser. No. 11/823,997, filed Jun. 29, 2007, entitled "SEGMENT RING MENU," now issued as U.S. Pat. No. 8,869,065, the disclosure of which is hereby incorporated by reference herein in its entirety.

BACKGROUND

User interfaces typically include menus that allow a user to access the functionality of the application. The more menu items included within a menu, however, make a menu more difficult to navigate, interact with and browse. Menus with expandable submenus (i.e. flyouts) generally include fewer top-level menu items but the menu items in the submenus are harder to navigate as compared to the top level menu items.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A segment ring menu is used to easily access menu items. Generally, the segment ring menu includes a number of sections with associated menus that are located equidistant from an initial mouse position from where the segment ring menu is evoked. For instance, a segment ring menu may include four quadrants, each of which is associated with a separate menu. Hovering over any of the sections of the segment ring menu displays the menu items hosted in that section. Additionally, a keyboard command, or some other input device may be used to display a section of the menu. The segment ring menu is directed at making it easy for the user to reach any of the menu items with a small amount of mouse movement.

DETAILED DESCRIPTION

Figure 1:
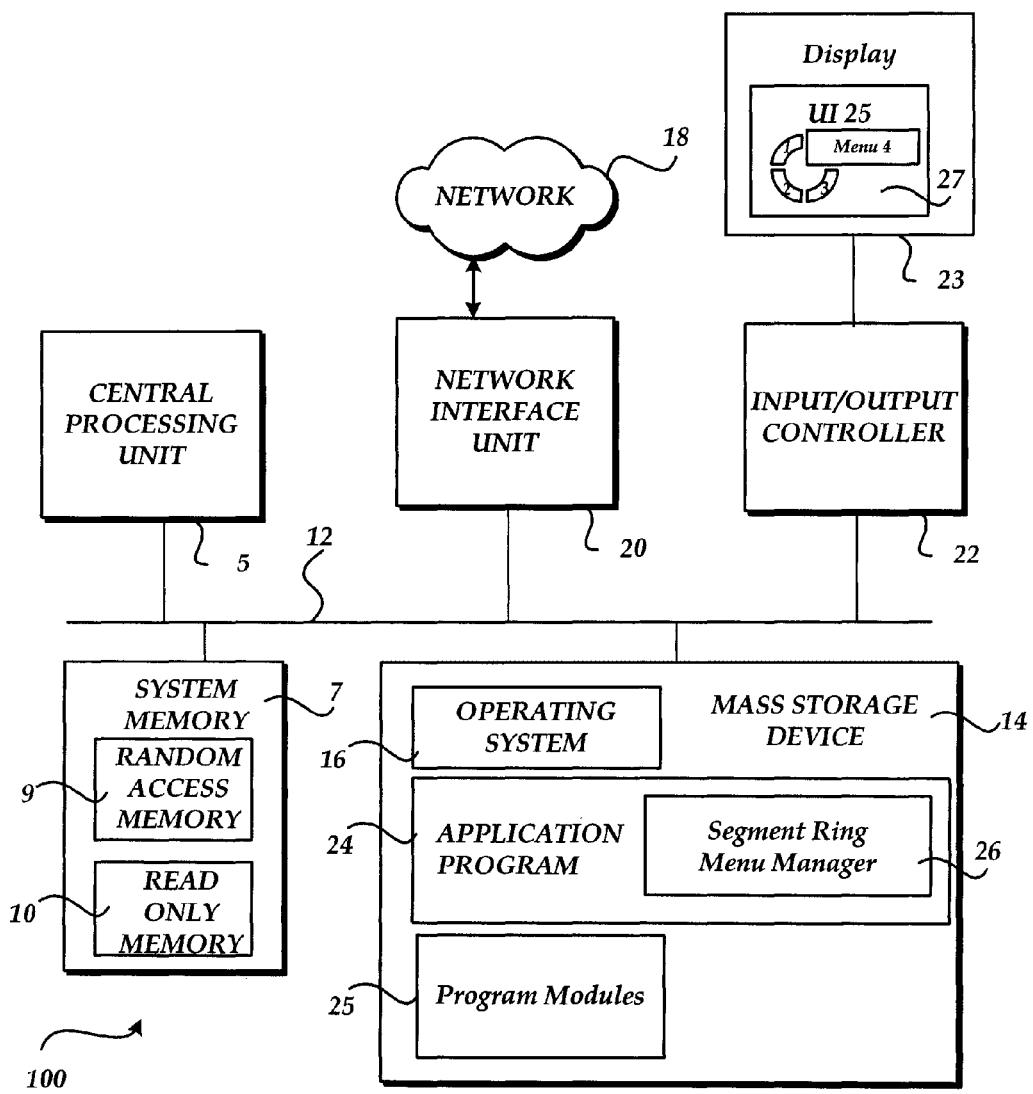
FIG. 1 illustrates an exemplary computing device.

Referring now to the drawings, in which like numerals represent like elements, various embodiment will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Referring now to FIG. 1, an illustrative computer architecture for a computer 100 utilized in the various embodiments will be described. The computer architecture shown in FIG. 1 may be configured as a desktop or mobile computer and includes a central processing unit 5 ("CPU"), a system memory 7, including a random access memory 9 ("RAM") and a read-only memory ("ROM") 10, and a system bus 12 that couples the memory to the central processing unit ("CPU") 5.

A basic input/output system containing the basic routines that help to transfer information between elements within the computer, such as during startup, is stored in the ROM 10. The computer 100 further includes a mass storage device 14 for storing an operating system 16, marked content file(s) 27, application program(s) 24, and other program modules 25, which will be described in greater detail below.

The mass storage device 14 is connected to the CPU 5 through a mass storage controller (not shown) connected to the bus 12. The mass storage device 14 and its associated computer-readable media provide non-volatile storage for the computer 100. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, Erasable Programmable Read Only Memory ("EPROM"), Electrically Erasable Programmable Read Only Memory ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100.

According to various embodiments, computer 100 may operate in a networked environment using logical connections to remote computers through a network 18, such as the Internet. The computer 100 may connect to the network 18 through a network interface unit 20 connected to the bus 12. The network connection may be wireless and/or wired. The network interface unit 20 may also be utilized to connect to other types of networks and remote computer systems. The computer 100 may also include an input/output controller 22 for receiving and processing input from a number of other devices, including a keyboard, mouse, or electronic stylus (not shown in FIG. 1). Similarly, an input/output controller 22 may provide output to a display screen 23, a printer, or other type of output device.

As mentioned briefly above, a number of program modules and data files may be stored in the mass storage device 14 and RAM 9 of the computer 100, including an operating system 16 suitable for controlling the operation of a networked personal computer, such as the WINDOWS® VISTA® operating system from MICROSOFT CORPORATION of Redmond, Wash. The mass storage device 14 and RAM 9 may also store one or more program modules. In particular, the mass storage device 14 and the RAM 9 may store one or more application programs 24. In conjunction with the operation of the application, application program 24 utilizes segment ring menu manager 26 to provide segment ring menus 27 through User Interface ("UI") 25 on display 23. Generally, a segment ring menu is a menu that includes a number of sections each with a corresponding menu that are located equidistant from the initial mouse position from where the segment ring menu is evoked. According to one embodiment, the associated menus are located approximately equidistant from the initial mouse position. As illustrated in FIG. 1, segment ring menu 27 includes a menu (1-4) that is associated with one of the four sections (or quadrants in this instance). Hovering over any of the sections of the segment ring displays the menu items hosted in that section. In the present example, menu 4 that is associated with section four is displayed. The segment ring menu layout is directed at making it easy for the user to reach any of the menu items with significantly less mouse movement as compared to traditional menu systems. Segment ring menu manager 26 is configured to display one of the menus that is associated with a section when invoked. The menu may be invoked many different ways. For example, a user may right click within a document, a user may enter a shortcut key, and the like. While segment ring menu manager 26 is shown as part of application 24, segment ring menu manager 26 may be separate from application 24. The user can easily access a menu from within segment ring menu 27 by moving the pointer from one section to the next. While a four menu segment menu system is shown, more or less menus may be designed to be equidistant from the center of the segment ring menu. For example, a three menu system, a two menu system, a six menu system and the like may be designed as a segment ring menu for application 24. As illustrated in UI 25, the user is hovering over section 4 of the segment menu 27 and menu 4 is provided to the user through UI 25 of display 23. Additional details regarding the segment ring menus will be provided below.

Figure 2:
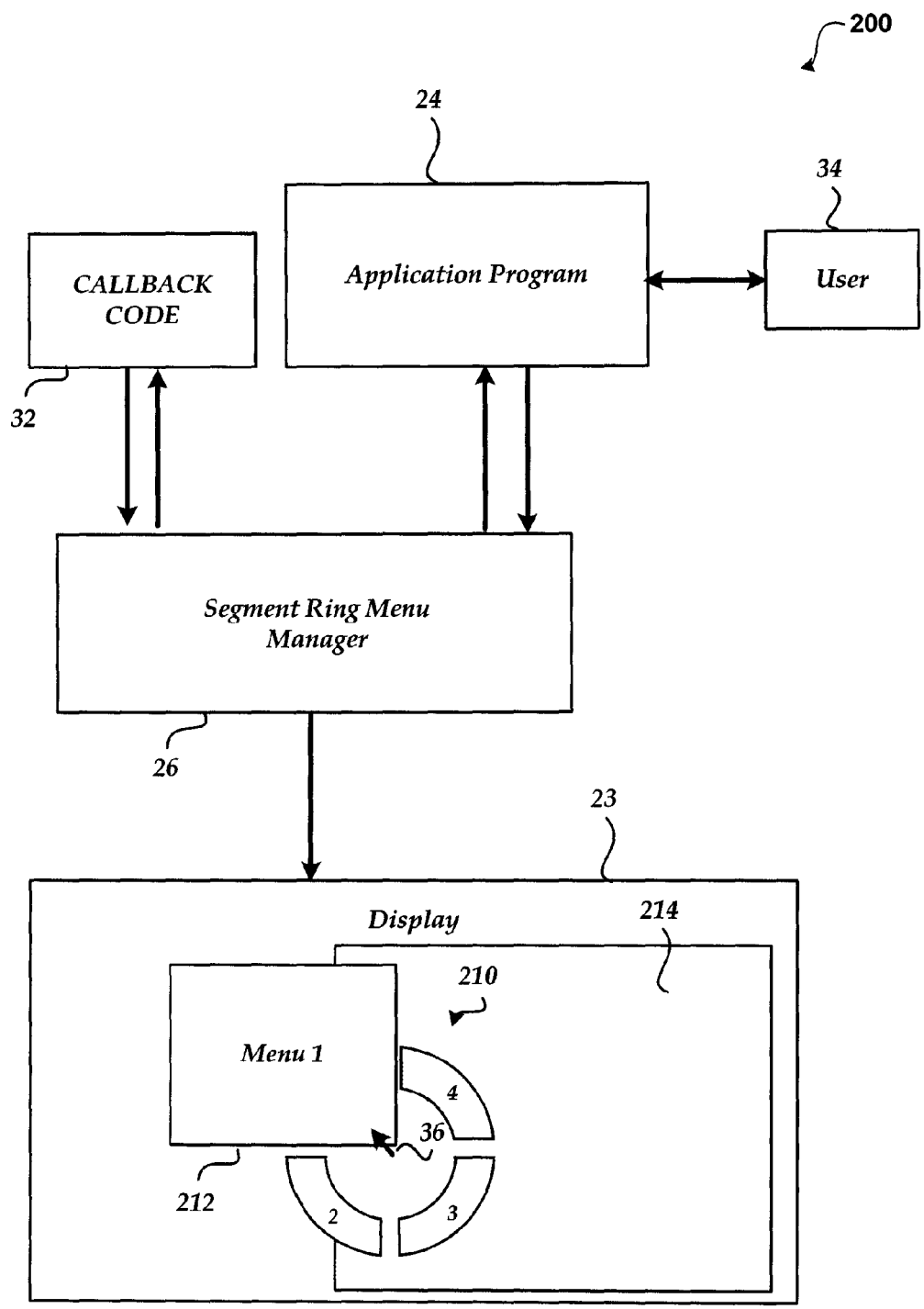
FIG. 2 shows a system for utilizing a segment ring menu.

FIG. 2 shows a system 200 for utilizing a segment ring menu. As illustrated, system 200 includes user 34, application program 24, callback code 32, segment ring menu manager 26, display 23 segment ring menu 210 including menu 212 and document 214.

In order to facilitate communication with the segment ring menu manager 26, one or more callback routines, illustrated in FIG. 2 as callback code 32 may be implemented. According to one embodiment, application program 24 is configured to provide segment ring menu manager 26 with input directing segment ring menu manager 26 to provide user 34 with a display of a segment ring menu, such as segment ring menu 210. According to one embodiment, segment ring context menu 210 is shown on the display 23 when the user clicks on the document canvas using the right mouse button (or alternatively, when the user presses the context menu key on the keyboard). In the current example, a user has right-clicked at pointer location 36 within display 23 which invoked segment ring menu 210. Initially, one of the sections, which is the default section for the given context, shows up on the screen. According to one embodiment, a circular transparent graphic is displayed that covers the other sections. For instance, in the present example, section one is considered the default segment and menu one 212 is displayed. According to one embodiment, a segment ring menu is used as a context menu. Generally, a context menu is a shortcut menu that contains menu items for commonly used items. The menu items contained within a context menu may vary depending on the context of the action, the application running, and the item selected. According to one embodiment, a context menu is activated by right clicking a mouse button or using a shortcut key. According to another embodiment, segment ring menus may be used as top level menus.

In the current example, the context menu items are spread across four ring segments that are located equidistant from the initial mouse position at which location the Segment Ring menu 210 is evoked. Hovering the cursor 36 over any one of the sections of the segment ring context menu displays items hosted in that section. For example, when cursor 36 is hovering over section one, menu 1 (212) is displayed. Dividing the menus in sections (such as quadrants) makes it easier for the user to reach the menu items with significantly less mouse movement as compared to traditional menu systems. According to one embodiment, one section of the ring context menu is visible on the display 23 at any given time. This helps to minimize the amount of document 214 being obscured by the menu 210. Additionally, distributing the menu contents across the section makes the content within the menu that is associated with each of the sections shorter. This assists in enabling the menu items to be hosted at the top level of a menu, rather than using a flyout menu. As previously stated, the segment ring menu may be divided into more or fewer sections depending on the requirements of the application program. Segment ring menu manager 26 determines which section cursor 36 is located and displays the appropriate menu. As such, it takes the same amount of mouse movement from the center of the menu 210 to expose the menu contents associated with any of the four sections, which makes segment ring menu more efficient than traditional menus with expandable submenus (i.e. flyouts).

Figure 3:
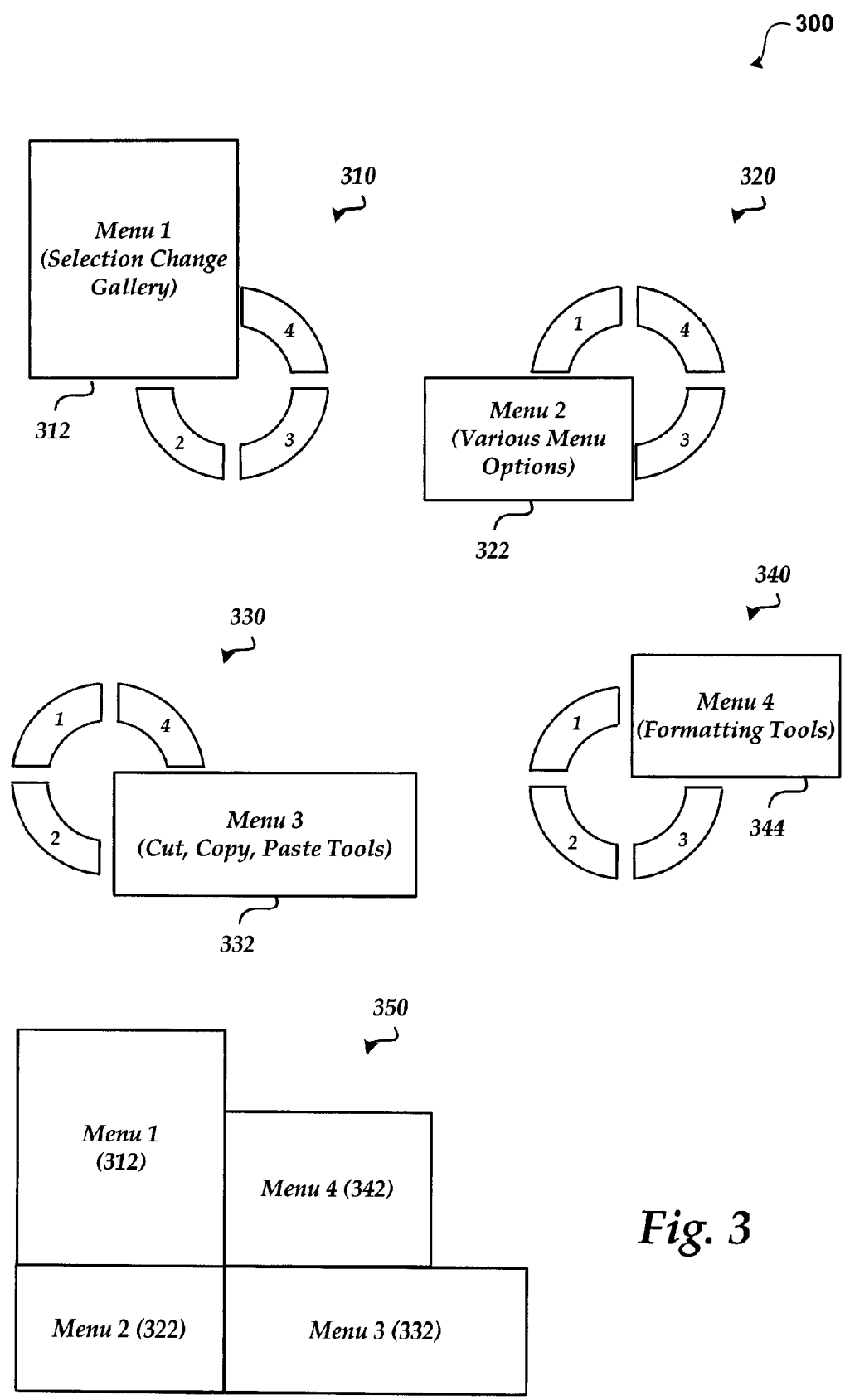
FIG. 3 illustrates exemplary segment ring menus.

FIG. 3 illustrates exemplary segment ring menus. The menu contents are organized into distinct sections, such as quadrants. This is regardless of the application, or the object which is selected. For example, four distinct quadrants may be provided including an upper-right section, a lower-right section, lower-left section, and an upper-left section. Illustration 310 shows the menu 312 in section one active. Illustration 320 shows the menu 322 in section two active. Illustration 330 shows the menu 332 in section three active. Illustration 340 shows the menu 344 in section four active. According to one embodiment, only one segment menu is displayed at a time in order to minimize the amount of obscured screen space. However, as illustration 350 shows, the segments are drawn in such a way that each one of them shows up at a distinct screen location. In other words, if all of the menus were shown at the same time, there would be no overlap between them.

According to one embodiment, the menu items included in the segment ring menus are consistent across applications. According to this embodiment, the upper-right section (section 4) includes direct, unlabeled formatting tools (see illustration 340). The lower-right section (section 3) includes cut, copy and paste tools (see illustration 330). The lower-left section (section 2) includes the menu part (see illustration 320) and the upper-left section (section 1) includes a selection changer gallery (see illustration 310). Other divisions (constant or otherwise) of the menu items may be utilized. The segment ring context menu is directed at facilitating more consistent content organization, being more scalable, while affording comparable (and frequently, improved) efficiency. According to one embodiment, the sections always host the same type of content, across all of the object types and across all of the applications, enabling the user to develop a sense of spatial constancy with which menu contents can be reached regardless of the context.

The user can dismiss the segment ring menu in the same way in which the traditional context menus are dismissed. For example, the segment ring menu may be dismissed by clicking on an area of the screen surface not covered by any of the currently visible segment ring menu pieces. Similarly, the associated menu may be dismissed when the user clicks on one of the menu options. Alternatively, the menu may stay open when the user clicks on a menu item. As is illustrated, the menus may be dismissed many different ways.

Figure 4:
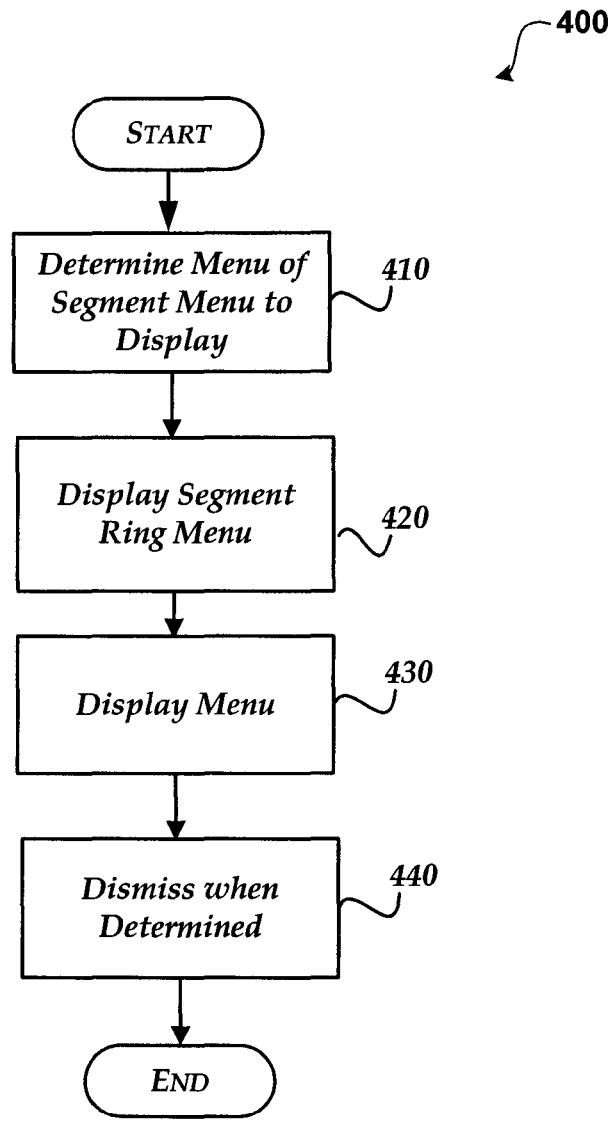
FIG. 4 shows an illustrative process for utilizing a segment ring menu.

Referring now to FIG. 4, an illustrative process 400 for utilizing a segment ring menu will be described. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

After a start operation, the process flows to operation 410, where the a determination is made as to what section of the quadrant menu is to be displayed. The menu to display may be determined many different ways. For example, when the segment ring menu is first displayed a default menu may be displayed that is associated with one of the sections. For example, the default menu may be determined. This determination may be made many different ways, such as from the context and/or a default selection. Alternatively, a keyboard command, or some other input, could be received indicating what menu to display. According to one embodiment, no section menu may be displayed until the cursor moves close to and/or over one of the sections of the segment ring menu after being displayed.

Moving to operation 420, the segment ring menu is displayed. According to one embodiment, the default menu and/or the activated menu is displayed along with a circular graphic of the segment ring menu at a location on the screen where the user activated the menu. According to one embodiment a determination is made as to whether there is room to display the menu at the location indicated by activating the menu through a right-click or some other method of locating the menu center. In some cases (for example, when the right-click occurs close to the edge of the screen, at a location where the segment ring menu would not fit on the screen), the menu associations may change within the segment ring and/or the segment ring menu may be moved such that each of its segments (when/if displayed) may be displayed in its entirety. For example, in order to ensure that the determined menu is displayed on the screen it may be associated with a different segment of the segment ring menu. In this case, the other menus would also be associated with another ring segments.

Flowing to operation 430, the menu for the section is displayed. According to one embodiment, the menu for the section is displayed such that it is displayed when the section is displayed. As discussed above, according to one embodiment, one menu is displayed at a time. As discussed above, a menu may remain displayed even after a selection depending on the use of the menu that is associated with the section.

Transitioning to operation 440, the menu is dismissed when determined. For example, the user can dismiss the segment ring menu by clicking on an area of the screen surface away from the segment ring menu. Similarly, each of the menus associated with a particular section may be dismissed when the user hovers over a different segment of the segment ring menu. Also, the menu may be dismissed when the use user executes a control contained in one of the segments.

The process then flows to an end operation and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for utilizing a segment ring menu, comprising:
   determining when to activate the segment ring menu;
   wherein the segment ring menu includes sections that are equidistant from a center of the segment ring menu;
   wherein each section is associated with a menu;
   selecting, based on a current context, one of the menus that is associated with one of the sections as a default menu when the current context is a first context;
   selecting a different one of the menus that is associated with a different one of the sections as the default menu when the current context is a second context;
   wherein the default menu is initially displayed, proximate to the section that is associated with the selected menu in response to activating the segment ring menu and before displaying the other menus that are not selected;
   determining a location to display the segment ring menu;
   determining when there is insufficient room to display the default menu at the location that is associated with the one of the sections that is associated with the segment ring menu;
   displaying the segment ring menu;
   displaying the default menu;
   determining the menu to display that is associated with one of the sections of the segment ring menu; and
   displaying the menu at a display location.

2. The method of claim 1, further comprises:
   determining when a pointer is over one of the sections and displaying a corresponding menu that is associated with the section when the pointer is over the section.

3. The method of claim 2, wherein determining when the pointer is over one of the sections comprises displaying the menu when the pointer is outside a portion of around the center of the segment ring menu and over the section.

4. The method of claim 1, wherein the segment ring menu is a context menu.

5. The method of claim 1, wherein at least two of the menus that are each associated with the sections of the segment ring menu are consistent across applications.

6. The method of claim 5, wherein at least one of the menus associated with the sections of the segment ring menu includes cut, copy and paste tools.

7. The method of claim 5, wherein at least one of the menus associated with the sections of the segment ring menu includes formatting tools.

8. The method of claim 1, wherein displaying the menu at the display location comprises displaying the menu over a different section of the segment ring menu when the menu cannot be drawn completely within the menu's associated section.

9. A computer-readable storage medium having computer-executable instructions for presenting a segment ring menu, that when executed perform actions, comprising:
determining when to activate the segment ring menu;
wherein the segment ring menu includes sections that are approximately equidistant from a center of the segment ring menu;
wherein each section is associated with a menu;
selecting, based on a current context, one of the menus that is associated with one of the sections as a default menu when the current context is a first context;
selecting a different one of menus that is associated with a different one of the sections as the default menu when the current context is a second context;
wherein the default menu is initially displayed proximate to the section that is associated with the selected menu in response to activating the segment ring menu and before displaying the other menus that are not selected;
determining a location to display the segment ring menu;
determining when there is insufficient room to display the default menu at the location that is associated with the one of the sections that is associated with the segment ring menu;
changing an association of the one of the sections that is associated with the default menu and changing the association of at least one of the other sections that is associated with another menu when there is insufficient room to display the default menu at the location such that the default menu is displayed in its entirety when it is displayed;
displaying the segment ring menu;
displaying the default menu;
determining a menu to display that is associated with one of the sections of the segment ring menu; and
displaying the menu such that the menu does not overlap any section with another one of the sections of the segment ring menu.

10. The computer-readable storage medium of claim 9, wherein determining the menu to display comprises determining when a pointer is over one of the sections and displaying a corresponding menu that is associated with the section when the pointer is over the section.

11. The computer-readable storage medium of claim 10, further comprising dismissing the segment ring menu when either a selection is made outside of the segment ring menu or when an option contained in the menu, wherein the option is set to close the menu when executed, is selected.

12. The computer-readable storage medium of claim 9, wherein the segment ring menu is a context menu and wherein displaying the segment ring menu comprises locating the segment ring menu around a position of a pointer.

13. The computer-readable storage medium of claim 9, wherein the segment ring menu includes at least three sections but no more than six sections.

14. The computer-readable storage medium of claim 13, wherein one of the menus includes cut, copy and paste tools and wherein another one of the menus includes formatting tools.

15. The computer-readable storage medium of claim 9, wherein each of the menus that are each associated with a section of the segment ring menu are consistent across applications.

16. The computer-readable storage medium of claim 9, wherein displaying the menu comprises associating a different section of the segment ring menu with the menu such that the menu is displayed over the different section when the menu cannot be drawn completely when it is associated with the section with which it is originally associated.

17. A system for utilizing a segment ring menu, comprising:
a processor and a computer-readable medium;
an operating environment stored on the computer-readable medium and executing on the processor; and
a segment ring menu manager operating under a control of the operating environment and operative to:
determine when to activate the segment ring menu;
wherein the segment ring menu is a context menu that includes sections that are positioned equidistant from a center of the segment ring menu;
wherein each section is associated with a menu;
selecting, based on a current context, one of the menus that is associated with one of the sections as a default menu when the current context is a first context;
selecting a different one of the menus that is associated with a different one of the sections as the default menu when the current context is a second context;
wherein the default menu is initially displayed proximate to the section that is associated with the selected menu in response to activating the segment ring menu and before displaying the other menus that are not selected;
determining a location to display the segment ring menu;
displaying the segment ring menu; and
displaying the default menu.

18. The system of claim 17, further comprising determining a menu to display in response to determining when a pointer is over one of the sections and displaying a corresponding menu that is associated with the section when the pointer is over the section.

19. The system of claim 18, wherein determining when the pointer is over one of the sections comprises displaying the menu when the pointer is outside of a portion of around the center of the segment ring menu and inside one of the sections.

20. The system of claim 17, wherein at least three of the menus that are each associated with a specific section of the segment ring menu are consistent across applications; wherein a first one of the menus includes cut, copy and paste tools; wherein a second one of the menus includes formatting tools; and wherein a third one of the menus includes a selection change gallery.

* * * * *